(12) United States Patent
Fabian et al.

(10) Patent No.: US 6,810,187 B2
(45) Date of Patent: Oct. 26, 2004

(54) OPTICAL WAVEGUIDE THERMOPLASTIC ELASTOMER COATING

(75) Inventors: Michelle D. Fabian, Horseheads, NY (US); Edward J. Fewkes, Horseheads, NY (US); Gregory F. Jacobs, Elmira, NY (US); Frederic C. Wagner, Horseheads, NY (US); Inna I. Kouzmina, Corning, NY (US); Michael L. Sorensen, Waverly, NY (US)

(73) Assignee: Corning Incorporated, Corning, NY (US)

( * ) Notice: Subject to any disclaimer, the term of this patent is extended or adjusted under 35 U.S.C. 154(b) by 456 days.

(21) Appl. No.: 09/917,459

(22) Filed: Jul. 27, 2001

(65) Prior Publication Data

US 2003/0053782 A1 Mar. 20, 2003

(51) Int. Cl.$^7$ ................................................ G02B 6/02
(52) U.S. Cl. ........................................ 385/128; 385/141
(58) Field of Search ....................... 385/128; 350/96.23, 350/96.33; 430/321

(56) References Cited

U.S. PATENT DOCUMENTS

| | | | |
|---|---|---|---|
| 4,243,298 A | * 1/1981 | Kao et al. | ................. 385/128 |
| 4,432,607 A | 2/1984 | Levy | |
| 4,492,428 A | 1/1985 | Levy | |
| 4,647,682 A | 3/1987 | Panster et al. | ............ 556/431 |
| 4,762,878 A | 8/1988 | Takeda et al. | |
| 4,849,462 A | 7/1989 | Bishop | .................... 522/97 |
| 4,962,992 A | * 10/1990 | Chapin et al. | ............ 385/102 |
| 5,250,390 A | 10/1993 | Gries | |
| 5,322,895 A | 6/1994 | Masse et al. | |
| 5,536,772 A | 7/1996 | Dillman et al. | |
| 5,837,749 A | 11/1998 | Erickson et al. | |
| 5,985,952 A | 11/1999 | Levy | |
| 6,042,943 A | 3/2000 | Levy | |
| 6,287,745 B1 | 9/2001 | Yamamura et al. | ......... 430/269 |

FOREIGN PATENT DOCUMENTS

| | | |
|---|---|---|
| JP | 60051639 A | 8/1983 |
| JP | 6059452 A | 3/1994 |
| WO | WO 96/11217 | 4/1996 |

OTHER PUBLICATIONS

Ferry, John D.; *Viscoelastic Properties of Polymers*; pp. 34–35; John Wiley & Sons, Inc., 1980.
Hiemenz, Paul C.; *Polymer Chemistry: The Basic Concepts*; pp. 103–107, 116–120; Marcel Dekker, Inc., 1984.
Rudin, Alfred; *The Elements Of Polymer Science And Engineering*; pp. 23–24; Alfred Rudin Ltd., 1982.
Masse et al.; United States Statutory Invention Registration; Registration No. H1786, Feb. 2, 1999.

(List continued on next page.)

*Primary Examiner*—John D. Lee
*Assistant Examiner*—Eric Wong
(74) *Attorney, Agent, or Firm*—Timothy R. Krogh; Robert L. Carlson

(57) ABSTRACT

A coated optical fiber and a curable coating composition for coating an optical fiber, includes a block copolymer comprising at least one hard block and at least one soft block, wherein said hard block has a $T_g$ greater than the $T_g$ of the soft block. The coating may further include at least one reactive monomer. A method for making a coated optical fiber, includes providing an optical fiber; coating the optical fiber with a polymerizable composition including a block copolymer comprising at least one hard block and at least one soft block, wherein said hard block has a $T_g$ greater than the $T_g$ of the soft block. The coating may further include at least one reactive monomer. The method further includes polymerizing the composition under conditions effective to form a coating over the optical fiber.

39 Claims, 2 Drawing Sheets

OTHER PUBLICATIONS

Barton, Thomas J., et al.; *Organosilicon Chemistry*; American Chemical Society, 1990; pp. 4–46.

Decker et al; "High–Speed Photocrosslinking of Thermoplastic Styrene–Butadiene Elastomers"; © 2000; vol. 77; pp. 1902–1912.

Decker et al; "Photocrosslinking of functionalized rubbers IX. Thiol–ene polymerization of styrene–butadiene–block––copolymers"; © 1999; Polymer vol. 41; pp. 3905–3912.

Xuan et al; "Photocrosslinking of Acrylated Natural Rubber"; © 1993; Journal of Polymer Science; vol. 31; pp. 769–780.

Reddy et al; "Influence of stress relaxation in primary coatings on low temperature attenuation in optical fibers"; © 1994; SPIE; vol. 2990; pp. 19–28.

Hetenyi; "General Solution of the Elastic Line"; © 1946; Beams on Elastic Foundation; pp. 1–9.

S.C. Grant et al; "The Effect of Temperature Dependent Materials Properties on Fiber Optic Cable Design"; © 1992; Poly. Eng. And Sci.; vol. 29, Issue 17; pp. 1186–1192.

Dupont et al; "UV Curing of Styrenic Block Copolymer Based Pressure Sensitive Adhesives"; © ; pp. 174–184.

Probst et al; "Experimental Verification of Microbending Theory Using Mode Coupling to Discrete Cladding Modes"; © 1989; Journal of Lightwave Technology; vol. 7; No. 1; pp. 55–61.

Baldauf et al; "Relationship of Mechanical Characteristics of Dual Coated Single Mode Optical Fibers and Microbending Loss"; © 1993; IEICE Trans. Commun.; vol. E76–B; No. 4; pp. 352–357.

Kakuta et al; "A Study of 16–Fiber Ribbon for Ultra High Density Optical Fiber Cable"; © 1994; International Wire & Cable Symposium Proceedings; pp. 423–429.

Akasaka et al; "Design and qualification of optical fiber coating for ribbon fiber"; © 1992; International Wire & Cable Symposium Proceedings; pp. 428–433.

Portinari et al; "Metal Free, Fully Filled Optical Cable for Telecommunication Use"; © 1981; International Wire & Cable Symposium Proceedings; pp. 161–173.

"Chemistry of Silane Coupling Agents"; © 1991; Chemistry; Chapter 2; pp. 31–54.

Gulati et al; "Influence of Poisson's Ratio on the Composite Expansion of Laminated Plates and Cylinders"; Research and Development Laboratories Corning Glass Works; pp. 196–206.

Bjarklev; "Microdeformation Losses of Single–Mode Fibers With Step–Index Profiles"; © 1986; Journal of Lightwave Technology; vol. LT–4; No. 3; pp. 341–346.

"Tailoring surfaces with silanes"; © 1977; Chemtech; pp. 766–778.

Gloge; "Optical–Fiber Packaging and Its Influence on Fiber Straightness and Loss"; © 1975; The Bell System Technical Journal; vol. 54; No. 2; pp. 245–262.

Matthewson; "Theoretical Aspects of Thin Protective Coatings"; © 1979; Physics and Chemistry of Solids; No. 73; pp. 1–6.

Levy; "Fibers, Optical"; Encyclopedia of Polymer Science and Engineering; vol. 7; pp. 1–15.

K. Petermann; "Microbending Loss in Monomode Fibres"; © 1976; Electronics Letters; vol. 12, No. 4; pp. 107–109.

S.P. Timoshenko et al; "Theory of Elasticity"; © 1961; pp. 380–383, (v)–(xi).

* cited by examiner

OPTICAL WAVEGUIDE THERMOPLASTIC ELASTOMER COATING

BACKGROUND OF THE INVENTION

1. Field of the Invention

The present invention relates to a curable coating composition for an optical fiber, an optical fiber prepared with such cured coating composition and a method for making an optical fiber that contains such coating.

2. Technology Review

Optical fibers have acquired an increasingly important role in the field of communications, frequently replacing existing copper wires. This trend has had a significant impact in the local area networks (i.e., for fiber-to-home uses), which has seen a vast increase in the usage of optical fibers. Further increases in the use of optical fibers in local loop telephone and cable TV service are expected, as local fiber networks are established to deliver ever greater volumes of information in the form of data, audio, and video signals to residential and commercial users. In addition, use of optical fibers in home and commercial business for internal data, voice, and video communications has begun and is expected to increase.

Optical fibers typically contain a glass core, a cladding, and at least two coatings, i.e., a primary (or inner) coating and a secondary (or outer) coating. The primary coating is applied directly to the cladding and, when cured, forms a soft, elastic, and compliant material which encapsulates the glass fiber. The primary coating serves as a buffer to cushion and protect the glass fiber core when the fiber is bent, cabled, or spooled. Stresses placed upon the optical fiber during handling may induce microbending of the fibers and cause attenuation of the light which is intended to pass through them, resulting in inefficient signal transmission. The secondary coating is applied over the primary coating and functions as a tough, protective outer layer that prevents damage to the glass fiber during processing and use.

Certain characteristics are desirable for the primary coating, and others for the secondary coating. The modulus of the primary coating is preferably sufficiently low to cushion and protect the fiber by readily relieving stresses on the fiber, which can induce microbending and degrade signal transmission. This cushioning effect is preferably maintained throughout the fiber's lifetime.

The primary coating preferably has a glass transition temperature ($T_g$) which is lower than the foreseeable lowest use temperature. This enables the primary coating to remain soft throughout the temperature range of use.

It is preferred for the primary coating to have a refractive index which is different from (i.e., higher than) the refractive index of the cladding. This refractive index differential between the cladding and the primary coating allows errant light signals to be refracted away from the glass core.

Finally, the primary coating must maintain adequate adhesion to the glass fiber during thermal and hydrolytic aging, yet be strippable therefrom for splicing purposes. Moisture resistance is important, because moisture also affects the adhesion of the primary coating to the glass. Poor adhesion can result in various sized delaminations which may lead to glass damage which can be significant sources of attenuation in the optical fiber.

Physical and chemical properties of polymer coatings contribute significantly to the overall performance of optical fibers. Among those are mechanical properties such as Young's modulus, tensile strength, toughness, percent elongation, glass adhesion, hydrophobicity, and low temperature sensitivity. Strong glass to primary coating adhesion and low water absorption are desired for strength and fatigue testing, as well as for field performance in general. The coating typically makes up 75% of optical fiber by volume, so the cost factor is also of concern.

One prior coating relates to a radiation curable primary coating composition for coating an optical fiber. In one embodiment, the coating composition includes a saturated aliphatic backbone having a first end and a second end. At least one epoxide group is at the first end and at least one reactive functional group is at the second end. The composition includes a mixture of acrylate monomers, composed of a first monomer having one acrylate group, and a second monomer having at least two functional groups. The composition further includes a photoinitiator.

Other prior coatings include the use of non-chemically crosslinked thermoplastic elastomers as part of a hot melt system for coating optical fibers.

Further prior coatings use liquid polymers as part of a UV curable primary coating composition for an optical fiber. These polymers are viscous liquids at room temperature and are of low molecular weight. They also have reactive functional groups, including epoxide, hydroxyl or acrylate groups, which allow for further chemical reactions. In addition, they require a cationic photoinitiator.

SUMMARY OF THE INVENTION

In accordance with one aspect of the present invention there is provided a curable coating composition for coating an optical fiber. The composition includes a block copolymer having at least one hard block and at least one soft block, wherein the hard block has a $T_g$ greater than the $T_g$ of the soft block. The composition also includes at least one reactive monomer.

In accordance with another aspect of the present invention there is provided a curable coating composition for coating an optical fiber. The composition includes a block copolymer including at least one hard block having a $T_g$ greater than about 20° C. and at least one soft block having a $T_g$ of less than about 20° C. The copolymer has a molecular weight of more than about 20,000. The composition also includes at least one reactive monomer.

In accordance with a further aspect of the present invention there is provided a coated optical fiber including an optical fiber having at least one cured coating layer thereon. The coating layer has a first component which includes a block copolymer having at least one hard block and at least one soft block, wherein the hard block has a $T_g$ greater than the $T_g$ of the soft block and a second component.

In accordance with an additional aspect of the present invention there is provided a method for making a coated optical fiber, including providing an optical fiber; coating the optical fiber with a polymerizable composition. The composition includes a polymer component having a block copolymer having at least one hard block and at least one soft block, wherein the hard block has a $T_g$ greater than the $T_g$ of the soft block. The composition also includes at least one reactive monomer. The method further includes polymerizing the composition under conditions effective to form a cured coating over the optical fiber.

It is an advantage of the present invention to provide a curable coating composition that possesses enhanced or increased thermal and hydrolytic stability.

Another advantage of the present invention is to produce a coated optical fiber having increased or enhanced mechanical properties such as modulus, toughness, tensile strength, and percent elongation.

Finally, a further advantage of the present invention is to provide a coating having strong glass to primary coating adhesion and low water absorption.

Additional features and advantages of the invention will be set forth in the detailed description which follows, and in part will be readily apparent to those skilled in the art from that description or recognized by practicing the invention as described in the written description and claims hereof, as well as the appended drawings. It is to be understood that both the foregoing general description and the following detailed description are merely exemplary of the invention, and are intended to provide an overview or framework to understanding the nature and character of the invention as it is claimed.

DETAILED DESCRIPTION OF PREFERRED EMBODIMENTS

Figure 1:
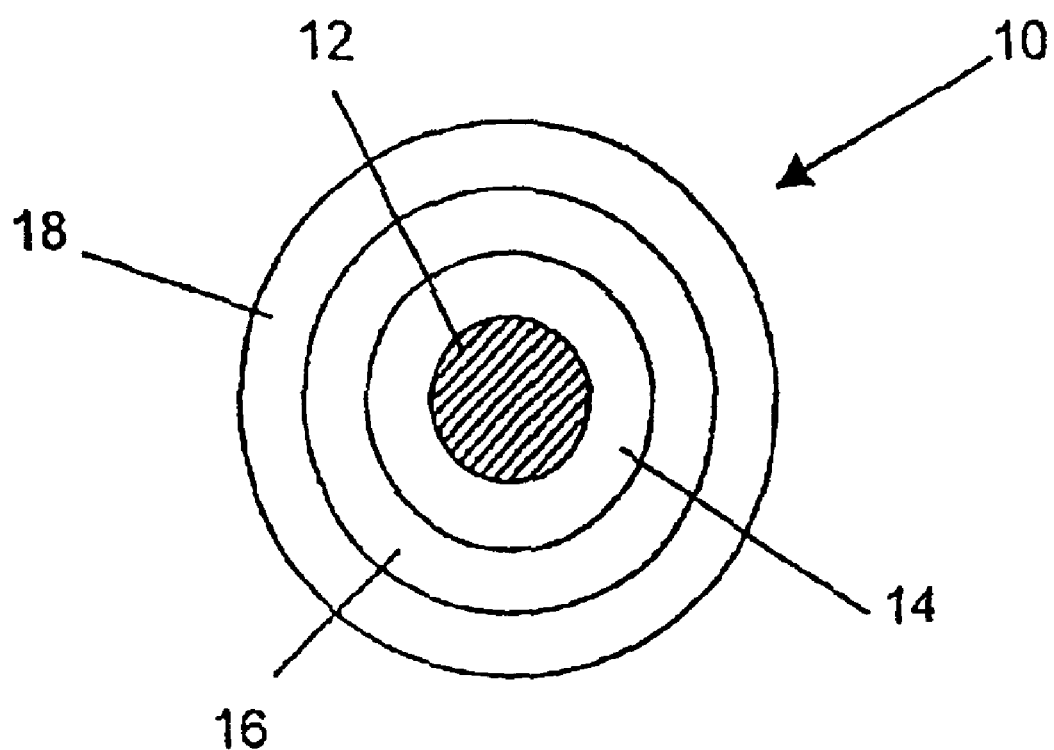
FIG. 1 is a cross-sectional view of a dual coated optical fiber of the present invention.

In accordance with one embodiment, the present invention relates to a curable coating composition for coating an optical fiber. The coating composition includes a block copolymer including at least one hard block and at least one soft block, wherein the hard block has a $T_g$ greater than the $T_g$ of the soft block. The composition also includes at least one reactive monomer. For the purposes of the present invention, a hard block has a $T_g$ greater than about 20° C. and a soft block has a $T_g$ of less than about 20° C. One example of a block copolymer is a di-block copolymer having the general structure of A-B. However, the invention is not limited to a di-block copolymer, a further example of a suitable copolymer is a tri-block having the general structure A-B-A. The block copolymer may have any number of multiple blocks. Preferably the coating is not a solid at ambient temperatures, more preferably the coating is substantially a liquid of ambient temperatures. It is further preferred that the coating has a finite viscosity of ambient temperatures.

In accordance with another embodiment, the composition includes a polymer component having at least two thermoplastic terminal end blocks and an elastomeric mid block backbone between the two end blocks. The composition further includes at least one reactive monomer. A thermoplastic is a polymer which softens and can be made to flow when it is heated. The thermoplastic polymer hardens on cooling and retains the shape imposed at elevated temperature.

The composition includes a polymer component that may or may not be chemically cross-linked when cured. Preferably, the polymer is a thermoplastic elastomer polymer. Preferably, the component has at least two thermoplastic terminal end blocks and an elastomeric backbone between two of the end blocks. The composition can include a polymer component in an amount of from about 5% by wt. to about 95% by wt., preferably from about 10% by wt. to about 30% by wt., and most preferably from about 12% by wt. to about 20% by wt. It is preferred that the polymer is present in at least about 10% or more, more preferably more than about 10%.

Suitable thermoplastic terminal end block materials include polystyrene and polymethyl methacrylate. The thermoplastic material is preferably a high polymer above its entanglement molecular weight. The entanglement molecular weight is the molecular weight at which the effects of neighboring molecules on molecular motion of the subject molecule can no longer be described solely in terms of local frictional forces; viscoelastic properties reveal a strong additional coupling to the neighboring molecules, the subject molecule acts as though it were localized at a few widely separated points along the subject molecule's molecular chain. For additional background regarding entanglement molecular weight, see pages 103–107 and 116–120 of *Polymer Chemistry*, (New York, N.Y.) (1984). The basic concepts are incorporated herein by reference.

Preferably the soft block has a $T_g$ of less than about 20° C. $T_g$ is determined in accordance with DMA at a frequency of 1 Hz. Preferably the mid block has a molecular weight of at least about 10,000, more preferably more than 20,000, still more preferably more than 50,000, and most preferably more than about 100,000. Preferably the soft block backbone is aliphatic. Suitable aliphatic backbones include poly (butadiene), polyisoprene, polyethylene/butylene, polyethylene/propylene, and diol blocks. In the case of a tri-block copolymer (A-B-A), the mid-block (B, such as butadiene in a SBS copolymer as defined herein ) has a $T_g$ of less than about 20° C. An example of a multi-block copolymer, having more than 3 blocks includes a thermoplastic polyurethane (TPU). Sources of TPU include BASF, B. F. Goodrich, and Bayer.

Suitable reactive monomers include ethylenically unsaturated monomers, such as acrylate monomers and vinyl ether monomers, epoxy monomers, styrene, styrene blends, maleate, and maleimide. Suitable monomers also include multi-functional monomers. The multi-functional monomer may be a thiol monomer. The thiol monomer may enhance crosslinking. The monomer may be used to adjust the viscosity of the coating. Suitable acrylate monomers include lauryl acrylate, ethoxylated nonylphenol acrylate, isodecyl acrylate. It is preferred for the composition to contain at least one reactive monomer, although more than one monomer can be introduced into the composition.

The composition can include reactive monomers in an amount of from about 5% by wt. to about 95% by wt., preferably from about 50% by wt. to about 90% by wt., and most preferably from about 70% by wt. to about 80% by wt.

Suitable ethylenically unsaturated monomers include lauryl acrylate (e.g., SR335 available from Sartomer Company, Inc. (West Chester, Pa.), Ageflex FA12 available from CPS Chemical Co. (Old Bridge, N.J.), and Photomer 4812 available from Cognis (Ambler, Pa.)), ethoxylatednonylphenol acrylate (e.g., SR504 available from Sartomer Company, Inc. and Photomer 4003 available from Cognis), caprolactone acrylate (e.g., SR495 available from Sartomer Company, Inc., and Tone M100 available from Union Carbide Company (Danbury, Conn.)), phenoxyethyl acrylate (e.g., SR339 available from Sartomer Company, Inc., Ageflex PEA available from CPS Chemical Co., and Photomer 4035 available from Cognis), isooctyl acrylate (e.g., SR440 available from Sartomer Company, Inc. and Ageflex FA8 available from CPS Chemical Co.), tridecyl acrylate (e.g., SR489 available from Sartomer Company, Inc.), phenoxyglycidyl acrylate (e.g., CN131 available from Sartomer Company, Inc.), lauryloxyglycidyl acrylate (e.g., CN130 available from Sartomer Company, Inc.), isobornyl acrylate (e.g., SR506 available from Sartomer Company, Inc. and Ageflex IBOA available from CPS Chemical Co.), tetrahydrofurfuryl acrylate (e.g., SR285 available from Sartomer Company, Inc.), stearyl acrylate (e.g., SR257 available from Sartomer Company, Inc.), isodecyl acrylate (e.g., SR395 available from Sartomer Company, Inc. and Ageflex FA10 available from CPS Chemical Co.), 2-(2-ethoxyethoxy)ethyl acrylate (e.g., SR256 available from Sartomer Company, Inc.), and combinations thereof.

When the coating is applied as a secondary coating, the ethylenically unsaturated monomers are preferably polyfunctional (i.e., each containing two or more functional groups), although monofunctional monomers can also be introduced into the composition. Therefore, the ethylenically unsaturated monomer can be a polyfunctional monomer, a monofunctional monomer, and mixtures thereof. Suitable functional groups for ethylenically unsaturated monomers used in accordance with the present invention include, without limitation, acrylates, methacrylates, acrylamides, N-vinyl amides, styrenes, vinyl ethers, vinyl esters, acid esters, and combinations thereof (e.g., for polyfunctional monomers).

Suitable polyfunctional ethylenically unsaturated monomers include, without limitation, alkoxylated bisphenol A diacrylates such as ethoxylated bisphenol A diacrylate with ethoxylation being 2 or greater, preferably ranging from 2 to about 30 (e.g. SR349 and SR601 available from Sartomer Company, Inc. West Chester, Pa. and Photomer 4025 and Photomer 4028, available from Cognis Corp. (Ambler, Pa.)), and propoxylated bisphenol A diacrylate with propoxylation being 2 or greater, preferably ranging from 2 to about 30; methylolpropane polyacrylates with and without alkoxylation such as ethoxylated trimethylolpropane triacrylate with ethoxylation being 3 or greater, preferably ranging from 3 to about 30 (e.g., Photomer 4149, Cognis Corp., and SR499, Sartomer Company, Inc.), propoxylated trimethylolpropane triacrylate with propoxylation being 3 or greater, preferably ranging from 3 to 30 (e.g., Photomer 4072, Cognis Corp. and SR492, Sartomer), and ditrimethylolpropane tetraacrylate (e.g., Photomer 4355, Cognis Corp.); alkoxylated glyceryl triacrylates such as propoxylated glyceryl triacrylate with propoxylation being 3 or greater (e.g., Photomer 4096, Cognis Corp. and SR9020, Sartomer); erythritol polyacrylates with and without alkoxylation, such as pentaerythritol tetraacrylate (e.g., SR295, available from Sartomer Company, Inc. (West Chester, Pa.)), ethoxylated pentaerythritol tetraacrylate (e.g., SR494, Sartomer Company, Inc.), and dipentaerythritol pentaacrylate (e.g., Photomer 4399, Cognis Corp., and SR399, Sartomer Company, Inc.); isocyanurate polyacrylates formed by reacting an appropriate functional isocyanurate with an acrylic acid or acryloyl chloride, such as tris-(2-hydroxyethyl) isocyanurate triacrylate (e.g., SR368, Sartomer Company, Inc.) and tris-(2-hydroxyethyl) isocyanurate diacrylate; alcohol polyacrylates with and without alkoxylation such as tricyclodecane dimethanol diacrylate (e.g., CD406, Sartomer Company, Inc.) and ethoxylated polyethylene glycol diacrylate with ethoxylation being 2 or greater, preferably ranging from about 2 to 30; epoxy acrylates formed by adding acrylate to bisphenol A diglycidylether and the like (e.g., Photomer 3016, Cognis Corp.); and single and multi-ring cyclic aromatic or non-aromatic polyacrylates such as dicyclopentadiene diacrylate and dicyclopentane diacrylate.

The composition may include several different types of monomers or one type of monomer. Typically, when multiple types of monomers are used, one monomer is chosen for its ability to dissolve the polymer and a second monomer is chosen for its ability to achieve a desired rate of cure. Further, monomers are chosen for the desired balance of final mechanical properties of the cured composition. When a single monomer is desired, preferably the monomer is chosen for its ability to dissolve the polymer. While not wishing to be bound by theory, it is believed that the monomers have the ability to form relatively strong secondary bond associations/interactions with the glass surface of the optical fiber, but not so strong that they prevent the fiber coating from being stripped using conventional techniques.

Optical fiber coating compositions may also contain a polymerization initiator which is suitable to cause polymerization (i.e., curing) of the composition after its application to a glass fiber. Polymerization initiators suitable for use in the primary coating compositions of the present invention include thermal initiators, chemical initiators, electron beam initiators, and photoinitiators. Preferably the composition includes a photoinitiator. Preferably, the photoinitiator is a non-cationic photoinitiator. For most acrylate-based coating formulations preferably photoinitiators include ketonic photoinitiating and/or phosphine oxide additives. When used in the compositions of the present invention, the photoinitiator is present in an amount sufficient to provide rapid ultraviolet curing.

The composition can include a photoinitiator in an amount of up to about 10% by wt., preferably from about 0.5% by wt. to about 6% by wt., and more preferably from about 2% by wt. to about 4% by wt.

The photoinitiator, when used in a small but effective amount to promote radiation cure, provides reasonable cure speed without causing premature gelation of the coating composition. A desirable cure speed is any speed sufficient to cause substantial curing of the coating materials. A preferred dosage for coating thicknesses of about 25–35 $\mu$m is, e.g., less than about 1.0 J/cm$^2$, preferably less than about 0.5 J/cm$^2$.

Suitable photoinitiators include 1-hydroxycyclohexylphenyl ketone (e.g., Irgacure 184 available from Ciba Specialty Chemical (Hawthorne, N.Y.)), (2,6-dimethoxybenzoyl)-2,4,4-trimethylpentyl phosphine oxide (e.g., commercial blends Irgacure 1800,1850, and 1700 available from Ciba Specialty Chemical), 2,2-dimethoxy-2-phenyl acetophenone (e.g., Irgacure 651, available from Ciba Specialty Chemical), bis(2,4,6-trimethylbenzoyl)-phenylphosphineoxide) (e.g., Irgacure 819, available from Ciba Specialty Chemical), Lucerin TPO (available from BASF) and combinations thereof.

As used herein, the weight percent of a particular component refers to the amount introduced into the bulk composition excluding an additional adhesion promoter and/or other additives. The amounts of additional adhesion promoter and various other additives that are introduced into the bulk composition to produce a composition of the present invention are listed in parts per hundred. For example, a monomer, polymer, and photoinitiator are combined to form the bulk composition such that the total weight percent of these components equals 100 percent. To this bulk composition, an amount of an adhesion promoter other than the bulk components, for example 1.0 part per hundred, can be employed in excess of the 100 weight percent of the bulk composition.

Preferably, an adhesion promoter is present in the coating composition. In a preferred embodiment, an adhesion promoter is present in the composition in an amount between about 0.1 to about 10 parts per hundred, more preferably between about 0.25 to about 4 parts per hundred, most preferably between about 0.5 to about 3 parts per hundred. Suitable adhesion promoters include alkoxysilanes, organotitanates, and zirconates. Preferred adhesion promoters include 3-mercaptopropyltrialkoxysilane (e.g., 3-MPTMS, available from United Chemical Technologies (Bristol, Pa.)), bis(trialkoxysilylethyl)benzene, acryloxypropyltrialkoxysilane, methacryloxypropyltrialkoxysilane, vinyltrialkoxysilane, bis(trialkoxysilylethyl)hexane, allyltrialkoxysilane, styrylethyltrialkoxysilane, and bis(trimethoxysilylethyl) benzene (available from Gelest (Tullytown, Pa.)); see U.S. patent application Ser. No. 09/301,814, filed Apr. 29, 1999, which is hereby incorporated by reference in its entirety.

In addition to the above-described components, the primary coating composition of the present invention can optionally include any number of additives, such as reactive diluents, antioxidants, catalysts, and other stabilizers and property-enhancing additives. Some additives can operate to control the polymerization process, thereby affecting the physical properties (e.g., modulus, glass transition temperature) of the polymerization product formed from the primary coating composition. Others can affect the integrity of the polymerization product of the primary coating composition (e.g., protect against de-polymerization or oxidative degradation). Optionally, the additive includes a carrier.

The carrier is preferably a carrier which functions as a carrier surfactant or ambiphilic reactive or non-reactive surfactant. Reactive surfactants which are partially soluble or insoluble in the composition are particularly preferred. Without being bound to a particular theory, it is believed that carriers interact with the compound containing a reactive silane by depositing such compounds on the glass fiber, where it is allowed to react. It is desirable for the carrier to be present in an amount between about 0.01 to about 10 parts per hundred, more preferably about 0.25 to about 3 parts per hundred.

Suitable carriers, more specifically carriers which function as reactive surfactants, include polyalkoxypolysiloxanes. A preferred carrier is available from Goldschmidt Chemical Co. (Hopewell, Va.) under the tradename Tegorad 2200, and reactive surfactant Tegorad 2700 (acrylated siloxane) also from Goldschmidt Chemical Co.

Other classes of suitable carriers are polyols and non-reactive surfactants. Examples of suitable polyols and non-reactive surfactants include polyol Aclaim 3201 (poly (ethylene oxide-co-propylene oxide)) available from Bayer (formerly known as Lyondel), Newtown Square, Pa., and non-reactive surfactants Tegoglide 435 (polyalkoxypolysiloxane) available from Goldschmidt Chemical Co. The polyol or non-reactive surfactants may be present in a preferred amount between about 0.01 pph to about 10 pph. Suitable carriers may also be ambiphilic molecules. An ambiphilic molecule is a molecule that has both hydrophilic and hydrophobic segments. The hydrophobic segment may alternatively be described as a lipophilic (fat/oil loving) segment.

A tackifier is also an example of a suitable carrier. A tackifier is a molecule that can modify the time-sensitive rheological property of a polymer product. In general a tackifier additive will make a polymer product act stiffer at higher strain rates or shear rates and will make the polymer product softer at low strain rates or shear rates. A tackifier is an additive commonly used in the adhesives industry that enhances the ability of a coating to create a bond with an object that the coating is applied upon. For additional background regarding tackifiers and tackifier resins, the *Handbook of Pressure Sensitive Adhesive Technology*, 3$^{rd}$ Edition, (Warwick, R.I.) (1999) is incorporated herein by reference, see pages 36, 37, 57–61, 169, 173, 174, and 609–631.

Preferred tackifiers are those classified as a terpene base resin, coumarone base resin, petroleum resin, hydrogenated petroleum resin, styrene resin, phenol resins, or rosin base resin. It is preferred that the tackifiers are nonepoxidized. The rosin base resins include unmodified rosin (e.g., wood, gum, or tall oil) and rosin derivatives. Rosin base resins can be classified by their rosin acids, which are either an abietic acid or a pimaric acid. Abietic acid type rosins are preferred. Rosin derivatives include polymerized rosin, disproportionated rosin, hydrogenated rosin, and esterified rosin. Representative examples of such rosin derivatives include pentaerythritol esters of tall oil, gum rosin, wood rosin, or mixtures thereof.

The terpene base resins include terpene polymers of α-pinene, β-pinene, dipentel, limonene, myrcene, bornylene and camphene, and phenol-modified terpene base resins obtained by modifying these terpene base resins with phenols.

The coumarone base resins include, for example, coumarone-indene resins and phenol-modified coumarone-indene resins.

Petroleum and hydrogenated petroleum resins include aliphatic petroleum resins, alicyclic petroleum resins, aromatic petroleum resins using styrene, a-methylstyrene, vinyltoluene, indene, methylindene, butadiene, isoprene, piperylene and pentylene as raw materials, and homopolymers or copolymers of cyclopentadiene. The petroleum resins are polymers using fractions having a carbon number of 5 to 9 as main components.

The styrene base resins include homopolymers which are low molecular weight polymers comprising styrene as a principal component, and copolymers of styrene with, for example, α-methylstyrene, vinyltoluene, and butadiene rubber.

The phenol base resins include reaction products of phenols such as phenol, cresol, xylenol, resorcinol, p-tort-butylphenol, and p-phenylphenol with aldehydes such as formaldehyde, acetaldehyde and furfural, and rosin-modified phenol resins.

A more preferred tackifier is Uni-tac® R-40 (hereinafter "R-40") available from International Paper Co., Purchase, N.Y. R-40 is a tall oil rosin, which contains a polyether segment, and is from the chemical family of abietic esters. Preferably, the tackifier is present in the composition in an amount between about 0.01 to about 10 parts per hundred, more preferred in the amount between about 0.05 to about 10 parts per hundred. A suitable alternative tackifier is the Escorez series of hydrocarbon tackifiers available from Exxon. For additional information regarding Escorez tackifiers, the specification of U.S. Pat. No. 5,652,308 is hereby incorporated by reference in its entirety. The aforementioned carriers may also be used in combination. For additional explanation regarding the carrier U.S. patent application Ser. No. 09/476,151 filed on or about Dec. 29, 1999 by Chien et al. is incorporated herein by reference in its entirety.

Another optional additive is a thiol containing compound. Examples of suitable thiol containing additive compounds include trimethylolpropane-tris-3-mercaptopropionate, tert-dodecanethiol, mercapto terminated liquid polymeric epoxy curing agent (e.g. Capcure LOF available from Cognis), $C_6$ to $C_{16}$ saturated dithiol, hexanedithiol, decanedithiol, cyclohexane dimethanol dithiol. Preferably the thiol containing compound is present in the composition in an amount of about 10 pph or less, more preferably about 5 pph or less, and most preferably about 1 to about 3 pph.

A preferred catalyst is dibutyl tin dilaurate, which is used to catalyze the formation of urethane bonds in some oligomer components. The terms oligomer and polymer are used synonymously herein. Whether the catalyst remains as an additive of the oligomer component or additional quantities of the catalyst are introduced into the composition of the present invention, the presence of the catalyst can act to stabilize an oligomer component in the composition.

A preferred antioxidant is thiodiethylene bis(3,5-di-tert-butyl)-4-hydroxyhydrocinnamate (e.g., lrganox 1035, available from Ciba Specialty Chemical).

The composition can further include additional additives such as waxes, lubricants, slip agents as well as other additives known in the art.

Referring to FIG. 1, the optical fiber 10 includes a glass core 12, a cladding layer 14 surrounding and adjacent to the glass core 12, a primary coating material 16 which adheres to the cladding layer 14, and one or more secondary (or outer) coating materials 18 surrounding and adjacent to the primary coating material 16. Any conventional material can be used to form the glass core 12, such as those described in U.S. Pat. No. 4,486,212 to Berkey, which is hereby incorporated by reference in its entirety. The core is typically a silica glass having a cylindrical cross section and a diameter ranging from about 5 to about 10 μm for single-mode fibers and about 20 to about 100 μm for multi-mode fibers. The core can optionally contain varying amounts of other material such as, e.g., oxides of titanium, thallium, germanium, and boron, which modify the core's refractive index. Other dopants which are known in the art can also be added to the glass core to modify its properties.

The cladding layer 14 preferably has a refractive index which is less than the refractive index of the core. A variety of cladding materials, both plastic and glass (e.g., silicate and borosilicate glasses) are used in constructing glass fibers. Any cladding materials known in the art can be used to form the cladding layer 14 in the optical fiber of the present invention.

The glass core 12 and cladding layer 14, which together form the glass fiber, can be formed according to a number of processes. In many applications, the glass core 12 and cladding layer 14 have a discernible core-cladding boundary. Alternatively, the core and cladding layer can lack a distinct boundary. The optical fibers of the present invention can contain these or any other conventional core-cladding layer configuration now known or hereafter developed.

The secondary coating material(s) 18 is typically the polymerization (i.e., cured) product of a coating composition that contains urethane acrylate liquids whose molecules become cross-linked when polymerized. The coating composition of the present invention can also function as the secondary coating. Other suitable materials for use in secondary coating materials, as well as considerations related to selection of these materials, are well known in the art and are described in U.S. Pat. Nos. 4,962,992 and 5,104,433 to Chapin, which are hereby incorporated by reference in their entirety. Various additives that enhance one or more properties of the coating can also be present, including the above-mentioned additives incorporated in the compositions of the present invention.

Preferably, secondary coating 18 has a Young's modulus of at least about 400 MPa, more preferably at least about 700 MPa, and most preferably at least about 1000 MPa. The $T_g$ is preferably at least about 40° C., more preferably at least about 60° C., and most preferably at least about 80° C. In one embodiment of fiber 10, the outer diameter of secondary coating 18 is about 245 μm.

Irrespective of the type of secondary coating employed, it is preferred that the outer surface of the secondary coating material 18 not be tacky so that adjacent convolutions of the optic fiber (i.e., on a process spool) can be unwound.

For additional explanation regarding secondary coating 18 U.S. patent application Nos. 60/220,919 filed Jul. 26, 2000 and 09/772,895 filed Nov. 27, 2000 are incorporated herein by reference in their entirety.

The coatings, preferably the secondary coating of the optical fiber of the present invention can optionally include a coloring material, such as a pigment or dye, or an additional colored ink coating.

The optical fibers of the present invention can also be formed into a optical fiber ribbon which contains a plurality of substantially aligned, substantially coplanar optical fibers encapsulated by a matrix material. The matrix material can be made of a single layer or of a composite construction. Suitable matrix materials include polyvinyl chloride as well as those materials known to be useful as secondary coating materials and the coating materials of the present invention. The matrix material can be similar in properties to the polymerization product of the composition used to form the secondary coating material.

In accordance with another embodiment, the present invention relates to a coated optical fiber having at least one coating layer thereon. In a preferred embodiment the coating layer includes a first component having at least two thermoplastic terminal end blocks and an elastomeric backbone between the two end blocks and a second component which may be cross-linked to the first component. For example the second component may be a reactive monomer which polymerizes when the coating is cured.

If the first component has a reactive group, for example butadiene present in the mid-block, polymerization could occur wherein the mid-block participates in the polymerization reaction. Alternatively, if the mid-block is non-reactive, such as a hydrogenated polybutadiene, the second component may polymerize and cross-link through and around the first component, rather than to the first component.

Preferably the coating layer is a primary coating on the optical fiber. However, the coating composition could also be used as a secondary coating or a matrix material of the optical fiber.

In accordance with another embodiment, the present invention relates to a method for making a coated optical fiber. The method includes providing an optical fiber and coating the optical fiber with a coating composition. The coating composition includes a component having at least two thermoplastic terminal end blocks, an elastomeric backbone between the two end blocks, and at least one reactive monomer. The coating composition is then polymerized under conditions effective to cure the coating. This method can be effected by standard methods with the use of a primary or secondary coating or matrix material composition of the present invention.

Briefly, the process involves providing the glass fiber (core 12 and cladding layer 14), coating the glass fiber with the primary coating composition of the present invention, and polymerizing the composition to form the primary coating material 16. Optionally, a secondary coating composition can be applied to the coated fiber either before or after polymerizing the primary coating. When applied after polymerizing the primary coating, a second polymerization step is preferably employed.

The core and cladding layer are typically produced in a single operation by methods which are well known in the art.

Suitable methods include: the double crucible method as described, for example, in Midwinter, *Optical Fibers for Transmission,* New York, John Wiley, pp. 166–178 (1979), which is hereby incorporated by reference in its entirety; rod-in-tube procedures; and doped deposited silica processes, also commonly referred to as chemical vapor deposition ("CVD") or vapor phase oxidation. A variety of CVD processes are known and are suitable for producing the core and cladding layer used in the optical fibers of the present invention. They include external CVD processes: Blankenship et al., "The Outside Vapor Deposition Method of Fabricating Optical Waveguide Fibers," *IEEE J. Quantum Electron.,* 18:1418–1423 (1982), which is hereby incorporated by reference in its entirety; axial vapor deposition processes: Inada, "Recent Progress in Fiber Fabrication Techniques by Vapor-phase Axial Deposition," *IEEE J. Quantum Electron.* 18:1424–1431 (1982), which is hereby incorporated by reference in its entirety; and modified CVD or inside vapor deposition: Nagel et al., "An Overview of the Modified Chemical Vapor Deposition (MCVD) Process and Performance," *IEEE J. Quantum Electron.* 18:459–476 (1982), which is hereby incorporated by reference in its entirety.

The primary and optional secondary coating compositions are coated on a glass fiber using conventional processes. It is well known to draw glass fibers from a specially prepared, cylindrical glass perform which has been locally and symmetrically heated to a temperature, e.g., of about 2000° C. As the preform is heated, such as by feeding the preform into and through a furnace, a glass fiber is drawn from the molten material. The primary and optional secondary coating compositions are applied to the glass fiber after it has been drawn from the preform, preferably immediately after cooling. The coating compositions are then cured to produce the coated optical fiber. The method of curing can be thermal, chemical, or radiation induced, such as by exposing the un-cured coating composition on the glass fiber to ultraviolet light or electron beam, depending upon the nature of the coating composition(s) and polymerization initiator being employed. It is frequently advantageous to apply both the primary coating composition and any secondary coating compositions in sequence following the draw process. One method of applying dual layers of coating compositions to a moving glass fiber is disclosed in U.S. Pat. No. 4,474,830 to Taylor, which is hereby incorporated by reference in its entirety. Of course, the primary coating composition can be applied and cured to form the primary coating material 16, then the secondary coating composition(s) can be applied and cured to form the secondary coating material 18.

Figure 2:
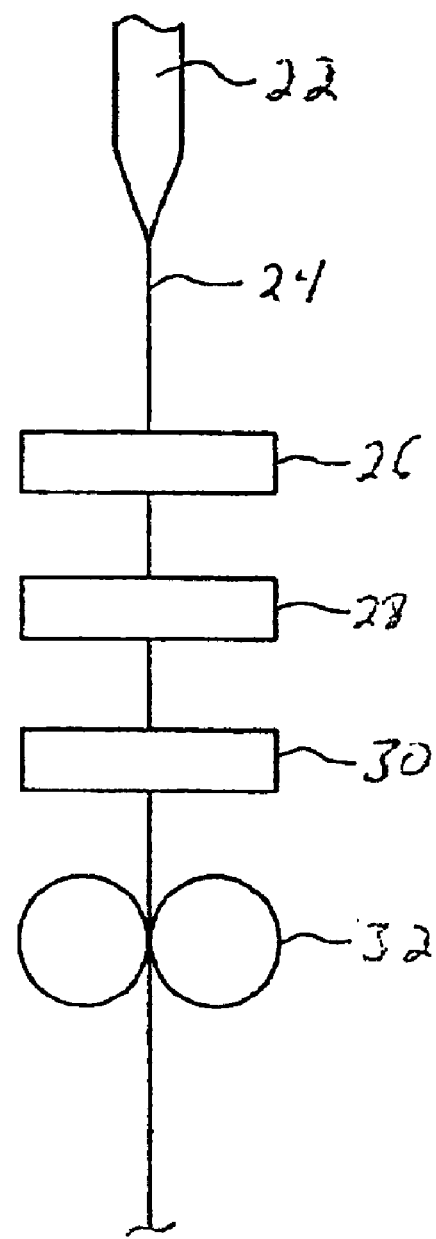
FIG. 2 is a schematic representation of a method for making an optical fiber in accordance with the invention.

FIG. 2 is a schematic representation of a process for drawing and coating an optical fiber. The partially sintered preform 22 is softened and drawn into a fiber 24. The uncoated fiber is then drawn through two coating dies 26 and 28 where the primary and secondary coatings, respectively, are applied to the fiber. The wet coated fiber is then cured by a bank of UV lamps 30. The fiber 24 is drawn from the preform and through the coating dies by a pair of tractors 32.

Coated optical fibers 10 of the present invention can also be used to prepare an optical fiber ribbon using conventional methods of preparation. For example, a plurality of coated optical fibers 10 are substantially aligned in a substantially coplanar relationship to one another and, while remaining in this relationship, the coated optical fibers are coated with a composition that is later cured to form the ribbon matrix material. The composition used to prepare the ribbon matrix material can be the same as the secondary coating composition, or any other suitable composition known in the art. Exemplary methods of preparing optical fiber ribbons are described in U.S. Pat. No. 4,752,112 to Mayr and U.S. Pat. No. 5,486,378 to Oestreich et al., which are each hereby incorporated by reference in their entirety.

The present invention can be illustrated by the following optical waveguide coating formulation. However, it is to be understood that reference to a specific composition is given by way of example only and is not to be restrictive of the invention, as claimed. The present embodiment includes the use of styrenic block copolymers ("SBC") in radiation curable optical fiber coating compositions also including a mixture of acrylate monomers, and a photoinitiator. While the concept has been demonstrated using acrylate functional monomers, other ethylenically unsaturated monomers could also be used provided that they are capable of dissolving the elastomers. Besides "SBC", other thermoplastic elastomers may be used. Preferably the elastomer is suitable to be dissolved in the monomer and enables the coating to be radiation cured. Suitable mid blocks include ethylene propylene diene monomer ("EPDM") and ethylene propylene rubber.

The elastomeric mid-block can be polybutadiene for the SBS series, polyisoprene for the SIS series, polyethylene/butylene for the SEBS series and polyethylene/propylene for the SEP series of copolymers. SBC's combine the properties of both thermoplastic materials and elastomers and are also known as Thermoplastic Elastomers (TPE).

Preferably, the styrenic block copolymers contain a backbone chain made up of three segments: elastomeric mid-block and two thermoplastic end-blocks. Among commercially available block copolymer structures are polybutadiene (SBS series), polyisoprene (SIS), polyethylene/butylene (SEBS), and polyethylene/propylene (SEP).

Examples of commercially available styrenic block copolymers are Kraton® (Kraton Polymers, Houston Tex.), Calprene® (Repsol Quimica S.A. Corporation, Spain), Solprene® (Phillips Petroleum Co), and Stereon® from Firestone Tire & Rubber Co., Akron, Ohio. In the neat state, these thermoplastic elastomers possess a double-phased morphology with a network made of physical crosslinks.

Thermoplastic rubbers can be incorporated into optical waveguide coating formulations resulting in considerable enhancement to mechanical properties of films including: a low modulus of less than about 1.5 MPa, preferably less than about 1.0 MPa, and more preferably less than about 0.7 MPa combined with high toughness, high percent elongation, low $T_g$, and lower cost compared to traditional urethane acrylate oligomers. The above properties were measured in accordance with ASTM 82-997.

Preferred coating compositions have the following values:

$T_g$ less than about 10° C., preferably less than about 0° C., more preferably less than about −20° C. measured by DMA (DMA 2980 available from TA Instruments, New Castle, Del.) operated under a fixed frequency of 1 Hz.

% Elongation: greater than about 80%, preferably greater than about 100%, more preferably greater than about 120%, and most preferably greater than about 175% or more, measured in accordance with ASTM 82-997.

The invention will be illustrated in greater detail by the following specific examples. It is understood that these examples are given by way of illustration and are not meant to limit the disclosure or the claims to follow. All percentages in the examples, and elsewhere in the specification, are by weight unless otherwise specified.

EXAMPLES

A number of primary coating compositions were prepared with the components listed in Table 1 below. The Kraton polymer and either the isodecyl acrylate or lauryl acrylate were introduced into a heated vessel and blended until the Kraton polymer was completely dissolved at a temperature range within the range of from about 40° C. to 70° C., preferably between about 50° C. to 60° C. The remaining components were introduced into the vessel and blending continued until the components were thoroughly mixed.

Blending was continued until the components were thoroughly mixed to yield a composition having a viscosity suitable for use in standard commercial coating operations, generally between about 50 to 150 poise at a temperature of about 25° C. or between about 5 to 15 poise at coating application temperature.

Once the compositions were prepared, primary and secondary coating materials were applied to drawn glass fibers subsequent to cooling. The glass fiber, having a diameter of about 125 μm, was introduced into a die block assembly. The die block assembly includes a guide die and a coating reservoir of one of the compositions listed in Table 1, and a sizing die. As the coated fiber was removed from the reservoir, the thickness of the primary coating composition was adjusted to about 32.5 μm by passing the coated fiber through the sizing die. The primary coating was then cured with ultraviolet radiation at a dose level of about 0.25 to 1.0 J/cm$^2$ using a D bulb (available from Fusion UV Systems, Inc. (Gaithersburg, Md.)).

Then the coated fiber was drawn through a second die block assembly containing a secondary coating composition. As the coated fiber was removed from the reservoir of the second coating composition, the thickness of the secondary coating composition was adjusted to about 27.5 μm by passing the coated fiber through a sizing die of the second die block assembly. The coated fiber was then cured with ultraviolet radiation at a dose level of about 0.25 to 1.0 J/cm$^2$ using a D bulb (available from Fusion UV Systems, Inc. (Gaithersburg, Md.)) to produce an optical fiber having a diameter of about 245±10 μm. The procedures set forth in ASTM 882-97 were used for determining tensile strength, % elongation, Young's modulus, Secant modulus, and toughness. Dynamic mechanical analysis was used to determine the $T_g$. The frequency was 1 hertz.

Table I summarizes the composition formulations of the Control and Examples 1–6.

TABLE I

| Formulation | Thermoplastic elastomer | Acrylated Monomer(s) | Cross-Linker | Photoinitiator |
|---|---|---|---|---|
| Control | * | | | |
| 1 | FG 1901X (20%) | Isodecyl Acrylate (75%) | Propoxylated$_6$ TMPTA (5%) | Irgacure 1850 (3 pph) |
| 2 | D1193 (20%) | Isodecyl Acrylate (75%) | Propoxylated$_6$ TMPTA (5%) | Irgacure 1850 (3 pph) |
| 3 | D1193 (20%) | Isodecyl Acrylate (75%) | Ethoxylated$_{20}$ TMPTA (5%) | Irgacure 1850 (3 pph) |
| 4 | D1101 (15%) | Lauryl acrylate (45%) Ethoxylated nonyl Phenol acrylate (40%) | Propoxylated$_3$ TMPTA* (2 pph) | Irgacure 184 (1.5 pph) Irgacure 819 (1.5 pph) |
| 5 | D1101 (15%) | Isodecyl acrylate (30%) Ethoxylated nonyl Phenol acrylate (55%) | Propoxylated$_3$ TMPTA (1 pph) | Irgacure 184 (1.5 pph) Irgacure 819 (1.5 pph) |
| 6 | D1101 (15%) | Isodecyl acrylate (45%) Ethoxylated nonyl Phenol acrylate (40%) | Propoxylated$_3$ TMPTA (1 pph) | Irgacure 184 (1.5 pph) Irgacure 819 (1.5 pph) |

* A urethane acrylate primary coating system available from DSM-Desotech of Elgin, IL, such as Desolite 950-092 RAW MATERIALS Monomers:

Propoxylated TMPTA Propoxylated$_3$—trimethylolpropane triacrylate, SR492, Sartomer Co, West Chester, Pa.

Thermoplastic Elastomers:

D1101 Kraton D1101 (Styrene-Butadiene linear block copolymer—SBS), Kraton Polymers, Houston, Tex.
D1193 Kraton D1193 (Styrene-Isoprene linear block copolymer—SIS), Kraton Polymers, Houston, Tex.
FG1901X Kraton FG1901X (Styrene-ethylene-butylene block polymer—S-EB-S, grafted with about 2% w maleic anhydride), Kraton Polymers, Houston, Tex.

Photoinitiator:

Irg 184 Irgacure 184 (1-hydroxycyclohexyl phenyl ketone) from Ciba Specialty Chemicals Corporation, Tarrytown, N.Y.
Irg 819 Irgacure 819 (Bis(2,4,6-trimethylbenzoyl)-phenylphosphineoxide) from Ciba Specialty Chemicals Corporation, Tarrytown, N.Y.

Table II summarizes the experimental results of the Control and Examples 1–6.

TABLE II

| Formulation | Young's Modulus (MPa) | % Elongation | Toughness* (Mpa/% Elongation) | Tg (DMA Tan Delta Peak) |
|---|---|---|---|---|
| Control | 1.0–1.3 | 80 | 22.1 | −20 |
| 1 | 0.50 | 188 | Not Calculated | −50 |

TABLE II-continued

| Formulation | Young's Modulus (MPa) | % Elongation | Toughness* (Mpa/% Elongation) | Tg (DMA Tan Delta Peak) |
|---|---|---|---|---|
| 2 | 0.40 | 110 | Not Calculated | −53 |
| 3 | 0.41 | 126 | Not Calculated | −58 |
| 4 | 0.8 | 104 | 37.64 | −39.9 |
| 5 | 0.44 | 168 | 31.68 | −32.4 |
| 6 | 0.39 | 171 | 34.11 | −39.0 |

*Toughness has been calculated by integrating the area under the stress-strain curve.

The test coatings 1–6 all exhibited a lower modulus than the control coating. The test coating exhibited a modulus of less than 1.0 MPa, preferably no more than about 0.8 MPa, more preferably no more than 0.5 MPa, and most preferably no more than about 0.45 MPa. The test coatings also exhibited a percent elongation of greater than 80, preferably greater than about 100, more preferably greater than about 125, and most preferably greater than about 150. Further the test coatings demonstrated a toughness of greater than about 23, preferably greater than about 25, and more preferably greater than about 30, and most preferably greater than about 35. Additionally, the test coatings exhibited a Tg of less than −20° C., preferably less than about −25° C., more preferably less than about −30° C., and most preferably less than about −40° C.

While the invention has been described with preferred embodiments, it is to be understood that variations and modifications may be resorted to as will be apparent to those skilled in the art. Such variations and modifications are to be considered within the purview and the scope of the claims appended hereto.

What is claimed is:

1. A curable coating composition for coating an optical fiber, comprising:
    a block copolymer comprising at least one hard block and at least one soft block and at least one reactive monomer comprising a multi-functional acrylate, wherein said hard block has a $T_g$ greater than the $T_g$ of the soft block;
    said block copolymer comprises a thermoplastic polyurethane, styrene butadiene, EPDM, ethylene propylene rubber, synthetic styrene butadiene rubber, styrenic block copolymers, or combinations thereof; and
    said elastomeric soft block comprises a poly(butadiene), hydrogenated polybutadiene, polyisoprene, polyethylene/butylene, polyethylene/propylene, diol block or combinations thereof.
2. The composition of claim 1, wherein said hard block comprises a thermoplastic.
3. The composition of claim 2, wherein said soft block comprises an elastomeric soft block.
4. The composition of claim 1, wherein said at least one reactive monomer comprises an ethylenically unsaturated monomer.
5. The composition of claim 1, wherein said at least one reactive monomer comprises a multi-functional monomer.
6. The composition of claim 1, wherein said at least one reactive monomer comprises a mono-functional monomer.
7. The composition of claim 1, wherein said at least one reactive monomer comprises vinyl ether, epoxy, acrylate, styrene, styrene blend, maleate, maleimide, or combinations thereof.
8. The composition of claim 7, wherein said acrylate monomer comprises lauryl acrylate, ethoxylated nonylphenol acrylate, isodecyl acrylate, iso-octyl acrylate, tridecyl acrylate, monomethoxy tripropylene glycol acrylate, ethoxylatednonylphenol acrylate, caprolactone acrylate, phenoxyethyl acrylate, phenoxyglycidyl acrylate, laurylox-yglycidyl acrylate, isobornyl acrylate, tetrahydrofurfuryl acrylate, stearyl acrylate, 2-(2-ethoxyethoxy)ethyl acrylate, or combinations thereof.
9. The composition of claim 2, wherein said thermoplastic hard block comprises polystyrene or polymethyl methacrylate.
10. The composition of claim 2, wherein said thermoplastic hard block comprises a non-chemically reactive functional group.
11. The composition of claim 1, further comprising a photoinitiator.
12. The composition of claim 11, wherein said photoinitiator comprises a non-cationic photoinitiator.
13. The composition of claim 1, further comprising at least one of an adhesion promoter, antioxidant, catalyst, stabilizer, property-enhancing additive, wax, lubricant, and slip agent.
14. The composition of claim 1, further comprising a reactive diluent.
15. The composition of claim 1, wherein a concentration of said reactive monomer comprises an amount of from about 5% by wt. to about 95% by wt.
16. The composition of claim 1, wherein a concentration of said copolymer comprises an amount of from about 5% by wt. to about 95% by wt.
17. A curable coating composition for coating an optical fiber, comprising:
    a block copolymer comprising at least one hard block having a $T_g$ greater than about 20° C. and at least one soft block having a $T_g$ of less then about 20° C., and at least one reactive monomer comprising a multi-functional acrylate, wherein said copolymer has a molecular weight of more than about 20,000; and
    at least one reactive monomer
    wherein said block copolymer comprises a thermoplastic polyurethane, styrene butadiene, EPDM, ethylene propylene rubber, synthetic styrene butadiene rubber, styrenic block copolymers, or combinations thereof; and said elastomeric soft block comprises a poly (butadiene), hydrogenated polybutadiene, polyisoprene, polyethylene/butylene, polyethylene/propylene, diol block or combinations thereof.
18. The composition of claim 17, wherein said copolymer has a molecular weight of more than about 50,000.
19. The composition of claim 17, wherein said copolymer has a molecular weight of more than about 100,000.
20. A coated optical fiber comprising an optical fiber having at least one cured coating layer thereon comprising a first component which comprises a block copolymer comprising at least one hard block and at least one soft block, wherein said hard block has a $T_g$ greater than the $T_g$ of the soft block; and a second component wherein said second component comprises at least one reactive monomer.
21. The coated fiber of claim 20, wherein said at least one cured coating layer comprises a UV cured layer.
22. The coated fiber of claim 20, wherein at least a portion of said second component is chemically cross-linked to said first component.
23. The coated fiber of claim 20, wherein said at least one hard block comprises polystyrene or polymethyl methacrylate.
24. The coated fiber of claim 20, wherein said second component comprises vinyl ether, epoxy, acrylate, styrene, styrene blend, thiol, maleate, maleimide, trimethylolpropane-tris-3-mercaptopropionate, tert-dodecanethiol, mercapto terminated liquid polymeric epoxy curing agent, $C_6$ to $C_{16}$ saturated dithiol, hexanedithiol, decanedithiol, cyclohexane dimethanol dithiol, or combinations thereof.

25. The coated fiber of claim 20, wherein said at least one coating layer further comprises at least one of an adhesion promoter, antioxidant, catalyst, stabilizer, property-enhancing additive, wax, lubricant, and slip agent.

26. The coated fiber of claim 20, wherein said at least one coating layer further comprises a photoinitiator.

27. The coated fiber of claim 20, wherein said at least one coating layer comprises a primary coating on the optical fiber.

28. A method for making a coated optical fiber, comprising:
providing an optical fiber;
coating the optical fiber with a polymerizable composition comprising a polymer component comprising a block copolymer comprising at least one hard block and at least one soft block and at least one reactive monomer comprising a multi-functional acrylate, wherein said hard block has a $T_g$ greater than the $T_g$ of the soft block and at least one reactive monomer; and
polymerizing the composition under conditions effective to form a cured coating aver the optical fiber, said block copolymer comprises a thermoplastic polyurethane, styrene butadiene, EPDM, ethylene propylene rubber, synthetic styrene butadiene rubber, styrenic block copolymers, or combinations thereof, and
said elastomeric soft block comprises a poly(butadiene), hydrogenated polybutadiene, polyisoprene, polyethylene/butylene, polyethylene/propylene, diol block or combinations thereof.

29. The method of claim 28, wherein said at least one reactive monomer comprises vinyl ether, epoxy, acrylate, styrene, styrene blend, thiol, maleate, maleimide, or combinations thereof.

30. The method of claim 28, wherein said at least one reactive monomer comprises a mono-functional monomer.

31. The method of claim 28, wherein said hard block comprises a thermoplastic hard block.

32. The method of claim 28, wherein said soft block comprises an elastomeric soft block.

33. The method of claim 31, wherein said thermoplastic hard block comprises polystyrene or polymethyl methacrylate.

34. The method of claim 31, wherein said thermoplastic hard block comprises a non-chemically reactive functional group.

35. The method of claim 28, further comprising coating the optical fiber with a second polymerizable composition.

36. The method of claim 35, wherein said polymerizing comprises simultaneously polymerizing said polymerizable composition and said second polymerizable composition to form a cured dual coating over the optical fiber.

37. The method of claim 35, further comprising polymerizing the second polymerizable composition.

38. The coated fiber of claim 20 wherein said second component comprises a reactive component.

39. The composition of claim 1 wherein the composition further comprises at least one additive selected from trimethylolpropane-tris-3-mercaptopropionate, tert-dodecanethiol, mercapto terminated liquid polymeric epoxy curing agent, $C_6$ to $C_{16}$ saturated dithiol, hexanedithiol, decanedithiol, cyclohexane dimethanol dithiol, and combinations thereof.

* * * * *